US008784097B2

(12) United States Patent
Fedi et al.

(10) Patent No.: US 8,784,097 B2
(45) Date of Patent: Jul. 22, 2014

(54) APPARATUS FOR THE PRODUCTION OF CLINKER FROM RAW MEAL AND RELATIVE PROCESS

(75) Inventors: Roberto Fedi, Bergamo BG (IT);
Antonio Clausi, Bergamo BG (IT);
Giovanni Cinti, Bergamo BG (IT)

(73) Assignee: Italcementi S.p.A., Bergamo BG (IT)

( * ) Notice: Subject to any disclaimer, the term of this patent is extended or adjusted under 35 U.S.C. 154(b) by 511 days.

(21) Appl. No.: 12/998,974

(22) PCT Filed: Dec. 17, 2009

(86) PCT No.: PCT/IB2009/007822
§ 371 (c)(1),
(2), (4) Date: Sep. 7, 2011

(87) PCT Pub. No.: WO2010/073090
PCT Pub. Date: Jul. 1, 2010

(65) Prior Publication Data
US 2011/0311931 A1     Dec. 22, 2011

(30) Foreign Application Priority Data
Dec. 23, 2008   (IT) .............................. MI2008A2311

(51) Int. Cl.
*F27B 15/02*     (2006.01)
(52) U.S. Cl.
USPC .............................................. 432/15; 432/58
(58) Field of Classification Search
USPC ........................................ 432/14, 15, 58, 106
See application file for complete search history.

(56) References Cited

U.S. PATENT DOCUMENTS

| 3,986,886 | A | * | 10/1976 | Sylvest ........................ 106/740 |
| 4,353,750 | A | * | 10/1982 | Quittkat ....................... 106/744 |
| 4,616,575 | A | * | 10/1986 | Schulte ........................ 110/345 |
| 5,704,780 | A | * | 1/1998 | Bauer ........................... 432/106 |
| 5,927,967 | A | * | 7/1999 | Bauer et al. .................... 432/72 |
| 6,012,918 | A | * | 1/2000 | Doumet ........................ 432/106 |
| 6,855,302 | B2 | * | 2/2005 | Eckert et al. .................. 423/210 |
| 2004/0042946 | A1 | * | 3/2004 | Vicard ........................ 423/215.5 |
| 2007/0178418 | A1 | * | 8/2007 | Meyer et al. ..................... 432/14 |

FOREIGN PATENT DOCUMENTS

| DE | 38 17 356 A1 | 7/1989 |
| DE | 39 05 454 A1 | 8/1990 |
| EP | 0 341 417 A | 11/1989 |

OTHER PUBLICATIONS

PCT Search Report dated Apr. 26, 2010.

* cited by examiner

*Primary Examiner* — Gregory A Wilson
(74) *Attorney, Agent, or Firm* — Hedman & Costigan, P.C.; James V. Costigan; Kathleen A. Costigan

(57) ABSTRACT

The present invention concerns an apparatus for the production of clinker from raw meal, comprising: a rotary kiln (8), optionally a precalciner; a multi-stage cyclone preheater (9) connected downstream of said rotary kiln (8) with respect to the direction of flow of the fumes (11) of a combustion taking place in said kiln (8); an electrofilter (10) connected downstream of said preheater (9) with respect to said direction of flow of the combustion fumes (11); characterized in that it comprises a first inlet (17) for feeding raw meal to said combustion fumes (11), said inlet (17) being arranged downstream of said preheater (9) and upstream of said electrofilter (10) with respect to said direction of flow of the combustion fumes (11), and in that it comprises a second inlet (18) for feeding partially preheated raw meal (14) from said electrofilter (10) to said preheater (9). The present invention also concerns an improved process for the production of clinker from raw meal.

16 Claims, 3 Drawing Sheets

APPARATUS FOR THE PRODUCTION OF CLINKER FROM RAW MEAL AND RELATIVE PROCESS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

The present invention concerns an improved apparatus for the production of clinker from raw meal and the relative process. Cement is a hydraulic binder used to bind inert solid materials, like sand and gravel, thus forming concrete and mortar, i.e. the base components for building.

BACKGROUND OF THE INVENTION

1. Field of the Invention

On the industrial scale, cement is made through mixing and grinding of clinker and gypsum with corrective substances like lime, slag and pozzolana. In the process for producing cement according to what is known as "dry" technology, the clinker is obtained by high temperature baking of a mixture of raw materials consisting mainly of lime (calcium carbonate) and clay (silica, alumina, iron oxides, as well as crystallisation water). The raw materials are mixed in solid state in the desired proportions and then finely ground until a homogeneous powder known as "raw meal" is obtained. In the present description, by "raw meal" we thus mean the homogeneous dust thus obtained used as starting material for producing clinkers.

The raw meal is transformed into a clinker by means of baking at a temperature of about 1450° C. in a rotary kiln essentially consisting of an inclined rotary cylinder.

During its transit in the rotary kiln, the raw meal is heated up to temperatures of about 1450° C. During heating the meal firstly undergoes complete calcining and, thereafter, reacts forming the calcium silicates and aluminates (clinkering reaction) that represent the main constituents of the clinker. More specifically, during the clinkering reaction there are a series of chemical reactions between calcium oxide, silicon oxide, aluminium oxide and iron oxide, said reactions being encouraged by the melting of a part of the raw materials themselves (aluminium and iron oxides).

The energy necessary to make the clinkering reaction take place is produced by means of a burner positioned on the head of the rotary kiln, at the opposite end with respect to that in which the meal is loaded. The fuels generally used are coal, petcoke, fuel oil, methane, as well as alternative fuels like, for example, meat meals.

The heat energy is transmitted to the raw meal subjected to treatment by irradiation in the baking area at the burner (temperature of about 2000° C.) and by convection and conduction by means of the combustion gases in the remaining part of the kiln.

At the end of the baking treatment, the clinker thus obtained is discharged from the rotary kiln and is quickly cooled in an air cooler in order to stabilise it.

2. Description of Related Art

The processes according to the state of the art are represented and discussed with reference to the following figures:

FIG. 1A, which shows a schematic representation of a clinker production plant according to the state of the art comprising a rotary kiln equipped with a 4 stage suspension preheater;

FIG. 1B, which shows a schematic representation of a clinker production plant according to the state of the art comprising a rotary kiln equipped with a 5 stage suspension preheater and a precalciner.

In the aforementioned figures the full lines indicate the flows of solid material, the dashed lines indicate the gaseous stream flows, whereas the Roman numerals indicate the stages of the suspension preheaters.

In clinker production plants known in the state of the art, the raw meal, before being fed to the rotary kiln, is subjected to a preheating and, optionally, precalcining treatment.

One of the currently most widely used preheating techniques is based on the use of the so-called "suspension preheater" or "multi-stage cyclone preheater" (hereafter also just "preheater"), consisting of a cyclone tower in which each preheating stage takes place in one or more cyclones. In such a type of preheater, by first cyclone we mean the cyclone in which the first preheating stage and the first separation between preheated meal and combustion fumes take place, by second cyclone we mean the cyclone in which the second preheating stage and the second separation between preheated meal and combustion fumes take place and the subsequent cyclones of the multi-stage cyclone preheater are analogously defined. In the present description, the first cyclone of the preheater, just like the subsequent cyclones, should always be interpreted according to the above definition.

The first stage, unlike the subsequent ones, is configured to minimize the carrying of dust by the combustion fumes from the kiln. Despite this, the concentration of dust in the combustion fumes exiting the preheater stays high (around 50-100 g/Nm$^3$).

The preheating and precalcining steps are carried out, respectively, in the preheater 1 and in the precalciner 2 (FIGS. 1A and 1B). The presence of these steps allows the partially calcined (30-40%) meal that has been preheated to a temperature of about 950° C. to be fed to the rotary kiln 3, with a substantial energy saving in the subsequent clinkering reaction. The presence of the preheating step, optionally accompanied by the precalcining step, also allows rotary kilns of reduced size to be used, thus reducing the heat losses that occur in such kilns and increasing the overall energy efficiency of the clinker production process.

In the preheater, the starting raw meal is gradually brought from the temperature of about 40° C. to about 950° C. The heating is carried out keeping the meal in suspension in a flow of hot gases, consisting of the combustion fumes of the rotary kiln, exploiting the large heat exchange surface between the meal and the combustion fumes.

In the preheating step the amount of time for which the solid phase (meal) is in contact with the gaseous phase (combustion fumes of the rotary kiln) is of fundamental importance. In order to ensure an optimal contact time between the solid phase and the gaseous phase, the suspension preheater consists of a series of cyclones (from 4 to 6) arranged one on top of the other to form a tower of variable height even up to 130-150 m. Such a preheater can be defined as a multi-stage cyclone preheater. The first preheating stage, which occurs at the top of the tower, can be carried out in two cyclones in parallel to ensure better efficiency of separation of the meal from the gaseous flow before it exits the preheater.

With reference to FIG. 1A, in the multi-stage cyclone preheater 1 the combustion fumes from the rotary kiln 3 and having a temperature of about 900-1000° C. pass through the cyclones from the bottom towards the top (from IV to I). The starting raw meal is mixed with the combustion fumes in the preheater 1, inside which it is inserted through an inlet 4, arranged at the top of the preheater, between the first (I) cyclone and the second (II) cyclone. The raw meal passes through the preheater up to the outlet in the lower part, transported from one cyclone to the next by the flow of combustion fumes. In each cyclone about 80% of the solid phase (meal) is separated from the gaseous phase (combustion fumes) to then be inserted once again in the gaseous phase entering into the cyclone below. The gaseous phase containing the remaining solid fraction (about 20% of the meal), on the other hand, flows to the next cyclone above.

At the bottom of the preheater 1, a preheated meal is obtained having a temperature of about 950° C. From the last preheating stage in the multi-stage cyclone preheater, the meal is discharged directly into the rotary kiln 3 for the subsequent clinkering reaction.

In plants equipped with a precalciner 2 (FIG. 1B), the preheated meal is fed from the preheater 1 to a suitable combustion chamber 5, equipped with a burner 6, inside which it undergoes a partial calcining process. The precalcined meal leaves the precalciner 2 and is fed, together with the combustion fumes of the precalciner 2, to the last stage (V) of the preheater 1 to then proceed towards the rotary kiln 3. The combustion fumes of the precalciner 2 flow together with those of the rotary kiln 3 and climb the preheater 1 up to the top outlet 7, after the first cyclone.

The gaseous flow exiting through the outlet 7 of the preheater, comprising the combustion fumes of the rotary kiln 3 and, optionally, those of the precalciner 2, has a temperature of about 270-360° C. Before being released into the atmosphere, this flow is generally used in other steps of the cement production process (for example, for grinding and drying the raw materials or else as combustion air in the rotary kiln or in the precalciner) to recover the heat content.

The preparation of the clinker in a cement production plant like the one described above generates enormous volumes of gaseous emissions, which can potentially pollute the environment.

The gaseous flow exiting the preheater is characterised by a high concentration of polluting substances, in particular nitrogen oxides (NO.) and dusts.

The $NO_x$ derive mainly from the combustion processes that take place in the rotary kiln and, optionally, in the precalciner. The main techniques currently used to reduce the $NO_x$ in the gaseous flow exiting the preheater are the following two:

Selective Non-Catalytic Reduction (SNCR) that foresees the reaction of the $NO_x$ with a reducing agent (for example ammonia or urea) in the high temperature area of the preheater;

Selective Catalytic Reduction (SCR) that foresees the reaction of the $NO_x$ with $NH_3$ as reducing agent in the presence of a catalyst.

The SNCR technique is effective if used on a gaseous flow having a temperature of 800-900° C. and allows most of the $NO_x$ present to be reduced (i.e. more than 50%).

The application of the SCR technique, only recently used in the field of electrical energy production and in the development phase in the field of cement, allows very high reduction yields (over 90%) to be achieved. The SCR technique is effective if used on a gaseous flow having a temperature of between about 300 and 400° C.

Considering this optimal temperature range, the SCR reduction system is installed in clinker production plants at the top outlet of the preheater, after the first cyclone, where the gaseous flow exiting through such an outlet, comprising the combustion fumes of the rotary kiln and, optionally, those of the precalciner, has a temperature of about 270-360° C.

The application of SCR technology does, however, have various drawbacks due mainly to the presence of substantial quantities of dust in the combustion fumes exiting the preheater. The dust, depositing on the walls of the catalyst, reduce the efficiency of the SCR reduction system, at the same time increasing the resistance to the passage of the gaseous flow and therefore the energy consumption linked to moving it.

The presence of dust in the treated gaseous effluent also means high energy consumption associated with the need to clean the catalyst with compressed air, as well as reducing the useful life of the catalyst due to the abrasive action that the dust exerts on the surface of the catalytic bed.

The high presence of dust is linked essentially to the limited efficiency of dust removal of the cyclones that make up the preheater. Although they are designed to maximise the separation efficiency, the cyclones are only able to effectively separate heavier dust.

Secondly, at the outlet of the preheater there can also be ashes generated by the combustion in the burners of the rotary kiln and of the precalciner of alternative fuels, like for example animal meals. The presence of ashes (containing phosphates) causes the catalyst to be poisoned and its $NO_x$ reduction effectiveness to consequently be decreased.

Sometimes in the fumes there are sulphur oxides, mainly in the form of $SO_2$, depending on the sulphur content of the raw materials used.

The $SO_2$ reduction in these cases can be carried out by means of injection of calcium oxide- and/or calcium hydroxide-based compounds in the combustion fumes, with consequent formation of calcium sulphate, said calcium sulphate advantageously being able to be recycled in the clinker production process. The effectiveness of reduction of the sulphur oxides in gaseous phase according to the aforementioned technique is also limited by the presence in the fumes of high concentrations of dust, which make it almost impossible to recycle unreacted lime.

The combustion fumes exiting the preheater, after having been purified of $NO_x$ and $SO_x$ and after having optionally been recycled through other steps of the production process to recover its residual heat, must finally be removed of dust before being released into the atmosphere.

The dust-removal process is normally carried out through filtering with electrofilters (also known as electrostatic precipitators) or else with fabric filters, the latter being most widely used in clinker production plants.

Unlike electrofilters that can filter gaseous flows even at a high temperature, fabric filters can only operate at temperatures below 250° C. (according to the type of fabric used). Therefore, the use of fabric filters to remove dust from the combustion fumes necessitates the installation of suitable systems for reducing the temperature of the gases to be filtered (for example, conditioning towers, heat exchangers, diluting air insertion) with a consequent increase in the investment costs and the energy consumption of the process.

The preparation of clinker in a cement production plant like the one described above also has other drawbacks.

The short contact time between the solid phase (meal) and the gaseous phase (combustion fumes) that can be made in a single stage of the suspension preheater necessitates the installation of many cyclones, making a multi-stage preheater, to reach an acceptable heat exchange level. This requires the construction of strong support structures of the preheater and, at the same time, high energy consumption associated with the transportation of the fumes and of the solid material through the preheater.

According to the production capacity of the plant and the specific production technologies adopted, the preheater can reach considerable heights (130-150 m), also causing "landscape defacement".

Moreover, even using 4-6 stage preheaters that allow extended contact times, the heat exchange between meal and combustion fumes is not sufficiently high to ensure that thermal equilibrium is reached. In preheaters known in the state of the art, the difference between the temperature of the meal and that of the combustion fumes exiting the preheater is on average about 40-50° C.

BRIEF SUMMARY OF THE INVENTION

The purpose of the present invention is to make an improved apparatus and process to overcome the highlighted drawbacks of the state of the art.

A first object of the present invention is an apparatus for the production of clinker from raw meal, comprising
- a rotary kiln 8, optionally a precalciner;
- a multi-stage cyclone preheater 9 connected downstream of said rotary kiln 8 with respect to the direction of flow of the fumes 11 of a combustion taking place in said kiln 8;
- an electrofilter 10 connected downstream of said preheater 9 with respect to said direction of flow of the combustion fumes 11;
  - characterised in that it comprises a first inlet 17 for feeding raw meal to said combustion fumes 11, said inlet 17 being arranged downstream of said preheater 9 and upstream of said electrofilter 10 with respect to said direction of flow of the combustion fumes 11, and in that it comprises a second inlet 18 for feeding partially preheated raw meal 14 from said electrofilter 10 to said preheater 9.

A second object of the present invention is an improved process for the production of clinker from raw meal in an apparatus comprising a rotary kiln 8, optionally a precalciner, a multi-stage cyclone preheater 9 and an electrofilter 10, said process comprising the following operating steps:
- a) making the combustion fumes 11, from the rotary kiln 8, flow from the bottom towards the top in the preheater 9;
- b) mixing the raw meal 22 with the combustion fumes 11 exiting the preheater 9, with preheating of the raw meal 14 by contact with the combustion fumes 11, and formation of a gaseous flow containing a partially preheated raw meal 14 in suspension;
- c) feeding the flow obtained in step b) to the electrofilter 10 and separating the partially preheated raw meal 14 from a flow of combustion fumes 15 free from dust;
- d) feeding the partially preheated raw meal 14 obtained in step c) to the preheater 9 and preheating the raw meal 14 by contact in countercurrent with the combustion fumes 11 that flow from the bottom towards the top;
- e) feeding the preheated raw meal 16 from step d) to the rotary kiln 8 for the subsequent production of clinker.

DETAILED DESCRIPTION OF THE INVENTION

Figure 1B:
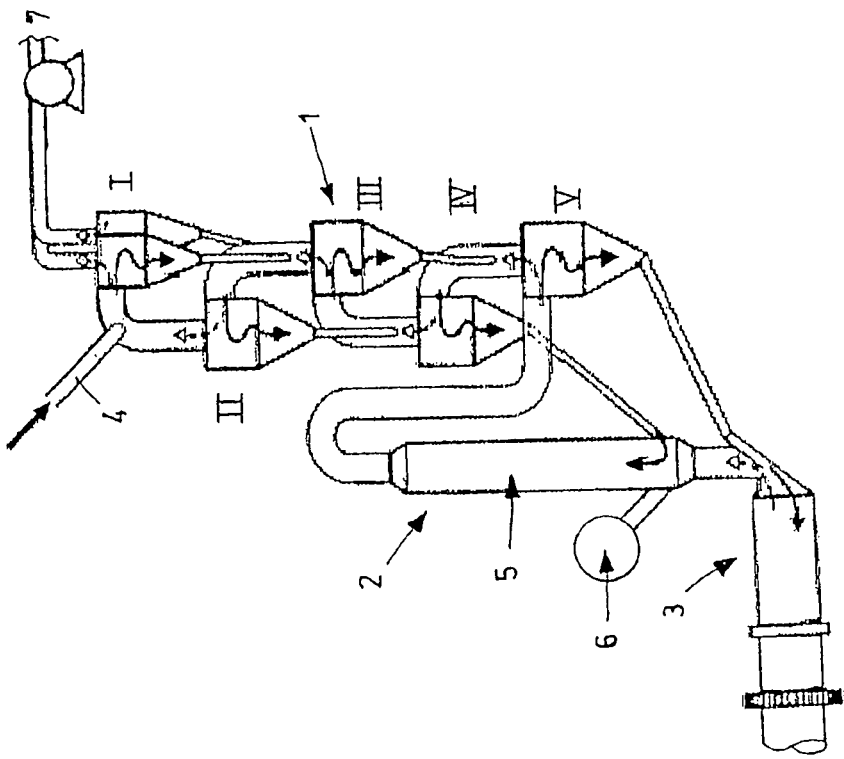
FIG. 1B is a side view of another prior art apparatus.
Figure 1A:
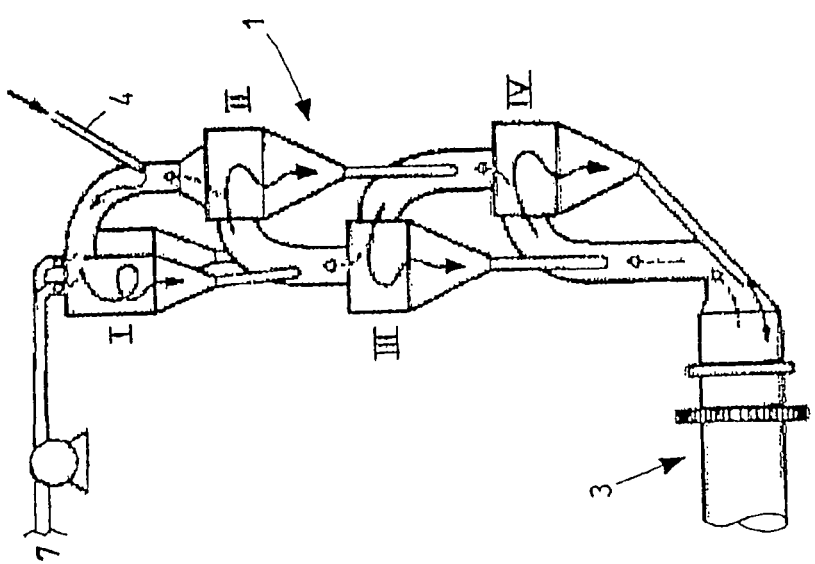
FIG. 1A is a side view of a prior art apparatus.
Figure 2:
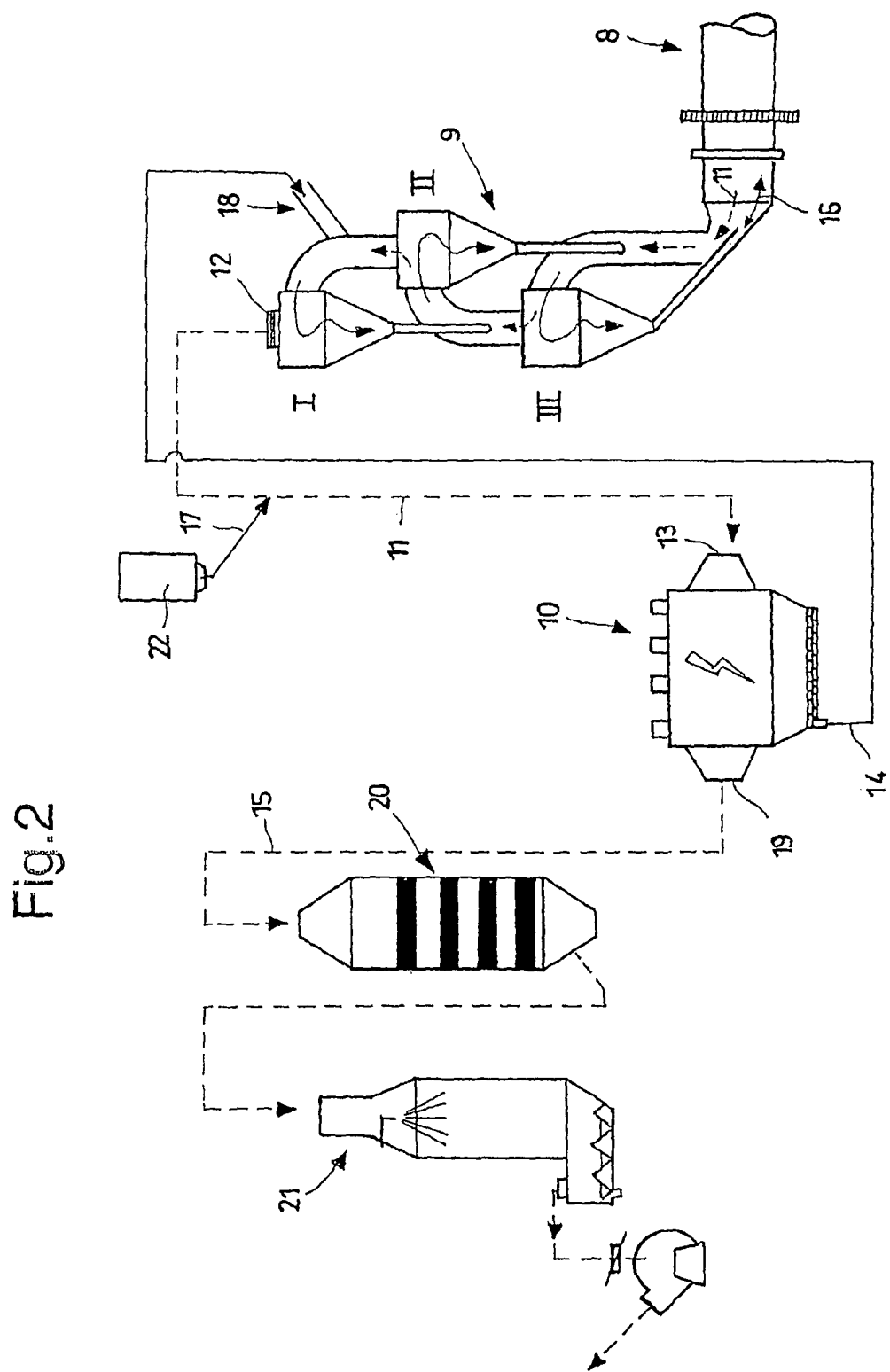
FIG. 2 is a schematic of the apparatus of the invention.
Figure 3:
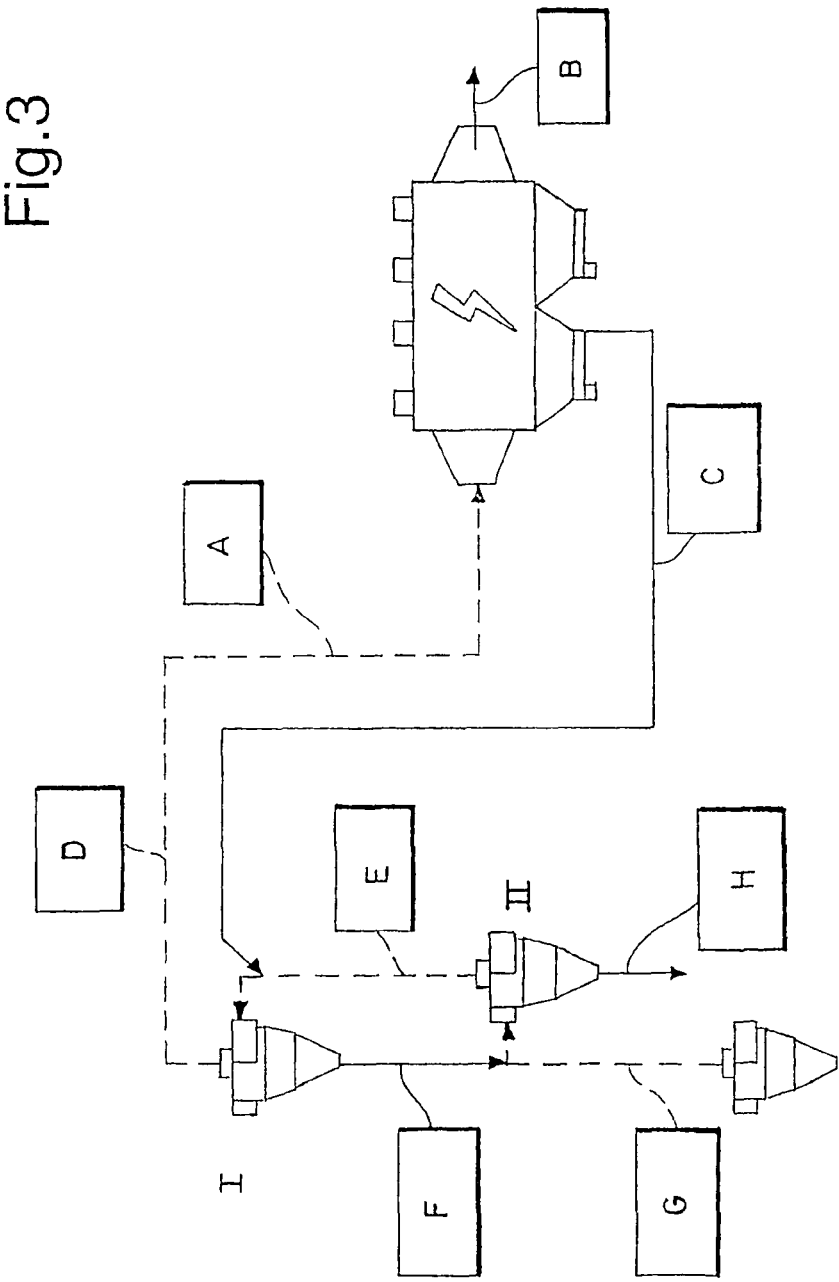
FIG. 3 is a schematic of the apparatus of the invention in which specific zones of the process are identified by letters.

A preferred embodiment of the apparatus and of the process according to the present invention is schematically represented in the attached FIGS. 2 and 3.

Also in FIGS. 2 and 3, the solid lines indicate the flows of solid material, the broken lines indicate the gaseous flows, whereas the Roman numerals indicate the cyclones of the suspension preheater.

Step a) of the process according to the present invention foresees making the combustion fumes 11, from the rotary kiln 8, flow from the bottom towards the top in the preheater 9. Similarly to what occurs in a clinker production plant according to the prior art, the combustion fumes 11 go into the preheater 9 at the bottom and climb up the cyclones of the multi-stage cyclone preheater 9 up to the upper outlet 12.

In step b) of the process, the starting raw meal 22 is mixed with the combustion fumes 11 exiting the preheater 9, with preheating of the raw meal 14 by contact with the combustion fumes 11, and formation of a gaseous flow containing a partially preheated raw meal 14 in suspension.

The insertion of the starting raw meal 22 into the combustion fumes 11 takes place through a suitable inlet 17 arranged downstream of the outlet 12 from the suspension preheater 9 and upstream of the inlet 13 into the electrofilter 10, with respect to the direction of flow of the combustion fumes 11. In this way, the raw meal 22 mixes with the combustion fumes 11 remaining in suspension in the gaseous phase and, at the same time, heating up, thus forming a gaseous flow containing the partially preheated raw meal 14 in suspension.

The temperature of the partially preheated raw meal 14 depends, as well as upon the temperature of the combustion fumes 11 exiting the outlet 12 of the preheater 9, also upon the length of the path that connects the inlet 17 of the raw meal 22 into the combustion fumes 11 to the inlet 13 into the electrofilter 10 of the partially preheated raw meal 14 in suspension (hereafter, "the length of said path". Indeed, the contact time between the raw meal 22 and the combustion fumes 11 and, therefore, the extent of the heat exchange between the combustion fumes 11 and the raw meal 22 depend upon the length of said path. By suitably selecting the length of said path, it is thus possible to vary the temperature of the partially preheated raw meal 14 entering into the preheater 9. In a preferred embodiment of the present invention, the length of said path is such that the partially heated raw meal 14 entering into the preheater 9 has a temperature within the range 250-400° C., preferably 270-360° C. In clinker production plants known in the state of the art, the raw meal subjected to preheating in a suspension preheater has a temperature of about 40° C. and reaches temperature values within the range 270-360° C. after having passed through at least the first two preheating stages. The use of the electrofilter connected to a suspension preheater in accordance with the present invention thus allows the suspension preheater to be fed with a raw meal at a much higher temperature. Consequently, in order to complete the preheating of the raw meal up to the entry temperature into the rotary kiln (about 950° C.) it is possible to use a suspension preheater having a smaller number of cyclone stages. Moreover, the apparatus according to the present invention is also much shorter than suspension preheaters used in clinker production plants since it has 1 or 2 less cyclones stages.

The temperature of the partially preheated raw meal 14 depends, as well as upon the temperature of the combustion fumes 11 exiting the outlet 12 of the preheater 9, also upon the length of the path that connects the inlet 17 of the raw meal 22 into the combustion fumes 11 to the inlet 13 into the electrofilter 10 of the partially preheated raw meal 14 in suspension (hereafter, more simply "path P"). Indeed, the contact time between the raw meal 22 and the combustion fumes 11 and, therefore, the extent of the heat exchange between the combustion fumes 11 and the raw meal 22 depend upon the length of said path P. By suitably selecting the length of the path P it is thus possible to vary the temperature of the partially preheated raw meal 14 entering into the preheater 9. In a preferred embodiment of the present invention, the length of said path P is such that the partially heated raw meal 14 entering into the preheater 9 has a temperature within the range 250-400° C., preferably 270-360° C. In clinker production plants known in the state of the art, the raw meal subjected to preheating in a suspension preheater has a temperature of about 40° C. and reaches temperature values within the range 270-360° C. after having passed through at least the first two preheating stages. The use of the electrofilter connected to a suspension preheater in accordance with the present invention thus allows the suspension preheater to be fed with a raw meal at a much higher temperature. Consequently, in order to complete the preheating of the raw meal up to the entry temperature into the rotary kiln (about 950° C.) it is possible to use a suspension preheater having a smaller number of cyclone stages. Moreover, the apparatus according to the present invention is also much shorter than suspension preheaters used in clinker production plants since it has 1 or 2 less cyclones stages.

In the subsequent step c) the gaseous flow obtained in step b) is fed to the electrofilter 10 where the partially preheated raw meal 14 is separated from a flow of combustion fumes free from dust 15. Such a separation takes place by electrostatic precipitation inside the electrofilter 10. The partially preheated raw meal 14 thus separated is fed to the preheater 9, where it is mixed with the combustion fumes 11 that flow inside the preheater itself (step d)) and preheated by contact in countercurrent with the combustion fumes 11 that flow from the bottom towards the top. For this purpose, the partially preheated raw meal 14 separated by means of the electrofilter 10 is inserted into the preheater 9 through an inlet 18 to the preheater 9. Such an inlet 18 can preferably be foreseen at an intermediate point between two cyclones, preferably between the first and the second cyclone.

By connecting the electrofilter 10 to the preheater 9 in the aforementioned way, it is possible to use the electrofilter 10 instead of one or more cyclones, also exploiting the better dust-removal efficiency of this kind of device with respect to cyclones.

In the final step of the process according to the present invention (step e)) the preheated raw meal 14 (at a temperature of about 950° C.) is discharged from the bottom of the preheater 9 into the rotary kiln 8 for the subsequent clinkering reaction.

In a preferred embodiment, the process according to the present invention also comprises a step f) consisting of subjecting the purified combustion fumes 15 exiting the electrofilter 10 to further purification treatments of the pollutants and/or heat recovery treatments.

In the preferred embodiment of the process according to the present invention illustrated in FIG. 2, the combustion fumes cleaned of dust 15 obtained by separation of the partially preheated raw meal 14 in step c) leave the electrofilter 10 through the outlet 19 to then be fed to further treatment stages to purify it of the pollutants and/or to recover its heat. For this purpose, the apparatus object of the present invention foresees suitable pollutant purification treatment means (20) and/or heat recovery means (21).

In the preferred embodiment of the process according to the present invention illustrated in FIG. 2, the combustion fumes cleaned of dust 15 obtained by separation of the partially preheated raw meal 14 in step c) leave the electrofilter 10 through the outlet 19 to then be fed to further treatment stages to purify it of the pollutants and/or to recover its heat. For this purpose, the apparatus object of the present invention foresees suitable pollutant purification treatment means and/or heat recovery means.

The combustion fumes cleaned of dust 15 can also be recycled to other steps of the clinker production process and, more generally, of the cement production process within which the clinker production apparatus according to the present invention is included.

For example, a further pollutant purification treatment to which the combustion fumes cleaned of dust 15 can be sent is a $NO_x$ reduction process. Preferably, this treatment is a selective catalytic reduction process (SCR) by means of reducing agents (for example ammonia). The SCR process can be carried out through a suitable selective catalytic reduction device, like for example an SCR device (FIG. 2), according to the ways known in the state of the art. The reducing agent can be fed in the gaseous flow upstream of the SCR device. Alternatively, the ammonia possibly present in the same flow of combustion fumes subjected to the SCR treatment can also be used as reducing agent. This ammonia derives from the heat treatment of the raw materials fed to the preheater and is transported by the combustion fumes through the electrofilter up to the catalyst of the SCR device. If the amount of ammonia deriving from the raw materials is insufficient, it is possible to feed an additional amount of ammonia or another reducing agent into the gaseous flow subjected to SCR.

Another purification treatment to which it is possible to subject the combustion fumes cleaned of dust 15 is a sulphur oxide reduction process (desulphurisation), in particular for reducing $SO_2$. Preferably, this process foresees the injection of calcium oxide- and/or calcium hydroxide-based compounds into the combustion fumes cleaned of dust 15, through a suitable injection device. The aforementioned desulphuring process (not shown in FIG. 2) can be carried out without distinction before or after the $NO_x$ reduction process.

The combustion fumes cleaned of dust 15 can also be fed to other steps of the clinker production process and, more generally, to other steps of the cement production process (for example, in the grinding and drying of the raw materials or else as combustion air in the rotary kiln and/or in the precalciner) to recover its residual heat before it is released into the atmosphere.

The residual heat of the combustion fumes cleaned of dust 15 can be recovered using suitable heat recovery means. For this purpose, the apparatus according to the present invention can, for example, comprise a heat exchanger of the air/air, air/diathermal oil, air/water-steam type or else a water conditioning tower (conditioning tower 21 in FIG. 2).

The process according to the present invention can also be applied in clinker production plants equipped with a precalciner. In this case, the combustion fumes of the rotary kiln are fed to the precalciner and from here, together with the combustion fumes of the precalciner, to the suspension preheater 9.

The apparatus according to the present invention and the relative process have various advantages with respect to the processes and apparatuses known in the state of the art.

In accordance with the present invention, the electrofilter is used in the clinker production process as an integral part of the production process, in particular as an integral part of the preheating apparatus. In the processes of the prior art the electrofilter is, instead, used just as a dust-removal device from gaseous flows before being released into the atmosphere.

The main advantages of the present invention are the following:

- the use of the electrofilter in combination with the suspension preheater allows the contact time between the raw meal and the combustion fumes during the preheating step to be increased, with a consequent improvement of the heat exchange and, therefore, of the thermal efficiency of the clinker production plant. Thanks to such an increase in thermal efficiency it is possible to eliminate one or more cyclones of the preheater (as schematically represented in FIG. 2, where the preheater 9 foresees just three cyclones), with a consequent reduction in height of the relative support structure, in investment costs and in environmental impact;
- the combustion fumes exiting the electrofilter are characterised by low dust content. This makes it possible to improve the reduction efficiency of the subsequent purification steps by reduction of the $NO_x$ and $SO_N$;
- in the case of use of a heat exchanger for recovery of the residual heat energy of the combustion fumes exiting the electrofilter, the low dust content reduces the typical problems of dirtying of the exchangers.

With regard to the removal of $NO_x$ through SCR reduction systems, the plant and process according to the present invention allow combustion fumes with a low dust content to be subjected to SCR treatment with a consequent:

- increase in reliability of operation of the catalyst, decrease in load losses (due to clogging of the catalyst) and therefore in energy consumption for the transportation of the gases;
- decrease in energy consumption associated with the use of compressed air during the SCR treatment to maintain a sufficient degree of cleanliness of the catalyst;
- decrease in maintenance interventions of the SCR system due to clogging of the catalyst, poisoning, etc.;
- possibility of using a smaller amount of catalyst, thus reducing the bulk and the costs of the SCR system;
- extension of the useful life of the catalyst.

Moreover, the present invention, allowing to overcome the problems of operation of the SCR reduction system connected with the high degree of dustiness of the combustion fumes, also allows the same reduction system to also be used to eliminate other types of polluting substances possibly present in the combustion fumes. For this purpose, indeed, it is sufficient to use, as well as the catalyst for the $NO_R$, an additional catalyst of suitable chemical composition.

Moreover, in the case in which alternative fuels are used in the clinker production process, the electrofilter ensures the reduction of the possible ashes produced (typically containing phosphates) that can cause the catalyst to be poisoned. A further advantage of the present invention is, therefore, to make the use of SCR technology compatible with any type of alternative fuels.

The following example embodiments are provided merely to illustrate the present invention and they should not be taken to limit the scope of protection defined by the attached claims.

Example 1

FIG. 3 schematically shows an apparatus according to the present invention comprising an electrofilter and a 3 stage cyclone suspension preheater. In said apparatus the path of the gaseous flow of the combustion fumes from the kiln (not shown) and of the raw meal to be preheated is such as to make three overall stages of preheating and relative separation of the preheated meal from the combustion fumes.

In order to demonstrate the high energy efficiency of the process and of the apparatus according to the present invention, the temperature of the gaseous flow (combustion fumes) and of the dust (meal) has been calculated in different points of the apparatus. For this purpose the following assumptions have been made:

- the gaseous flow and the dust exiting the cyclones and the electrofilter are in thermal equilibrium;
- the concentration of dust in the gaseous flows exiting the cyclones and the electrofilter are negligible, i.e. the separation efficiency is close to 100%.

The calculation of the temperatures of the gaseous flows and of the dust was carried out by repeatedly searching for the temperature values that bring the energy balances of each stage of the process into equilibrium.

The mass balance was made by taking the amount of clinker produced, expressed in kg, as reference. This amount is less than that of the raw meal fed to the process to obtain the clinker (about 1.55 kg of raw meal is needed to produce 1 kg of clinker).

From the calculations carried out, in points A-H of the apparatus the combustion fumes and the meal have the following characteristics:

| Point A (meal): | |
|---|---|
| Amount: | 1.55 kg/kg of clinker |
| Temperature: | 50° C. |
| Calorie content: | 24 kcal/kg of clinker |
| Point B (fumes): | |
| Amount: | 1.5 Nm³/Kg of clinker |
| Temperature: | 308° C. |
| Calorie content: | 166 kcal/kg of clinker |
| Point C (meal): | |
| Amount: | 1.65 kg/kg of clinker |
| Temperature: | 308° C. |
| Calorie content: | 158 kcal/kg of clinker |
| Point D (meal): | |
| Amount: | 0.10 kg/kg clinker |
| Temperature: | 576° C. |
| Calorie content: | 18 kcal/kg clinker |
| Point D (fumes): | |
| Amount: | 1.4 Nm³/Kg of clinker |
| Temperature: | 576° C. |
| Calorie content: | 282 kcal/kg of clinker |
| Point E (meal): | |
| Amount: | 0.10 kg/kg of clinker |
| Temperature: | 826° C. |
| Calorie content: | 26 kcal/kg of clinker |
| Point E (fumes): | |
| Amount: | 1.3 Nm³/Kg of clinker |
| Temperature: | 826° C. |
| Calorie content: | 386 kcal/kg of clinker |

-continued

| Point F (meal): | |
|---|---|
| Amount: | 1.65 kg/kg of clinker |
| Temperature: | 526° C. |
| Calorie content: | 270 kcal/kg of clinker |
| Point G (meal): | |
| Amount: | 0.10 kg/kg of clinker |
| Temperature: | 860° C. |
| Calorie content: | 27 kcal/kg of clinker |
| Point G (fumes): | |
| Amount: | 1.2 Nm³/Kg of clinker |
| Temperature: | 860° C. |
| Calorie content: | 372 kcal/kg of clinker |

The energy balance of each of the 3 preheating stages is the following:
First Stage (Electrofilter)

Input flow(kcal/kg of meal treated):282(Point D,fumes)+18(Point D,meal)+24(Point A, meal)=324.

Output flow(kcal/kg of meal treated):166(Point B,fumes)+158(Point C,meal)=324.

Second Stage (Cyclone I)

Input flow(kcal/kg of meal treated):386(Point E,fumes)+26(Point E,meal)+158(Point C, meal)=570.

Output flow(kcal/kg of meal treated):282(Point D,fumes)+18(Point D,meal)+270(Point F, meal)=570.

Third Stage (Cyclone II)

Input flow(kcal/kg of meal treated):270(Point F,meal)+372(Point G,fumes)+27(Point G, meal)=669.

Output flow(kcal/kg of meal treated):386(Point E,fumes)+26(Point E,meal)+256(Point H, meal)=668.

The difference between the value of the input flow and the output flow (1 kcal/kg of clinker) that is observed in the third stage is due to the approximation of the calculation.

The aforementioned values of the temperatures of the gaseous flows and of the dust show that the heat exchange able to be obtained with the apparatus according to the present invention is comparable to that of a 6 stage cyclone suspension preheater according to the state of the art. In particular, the calculations of the example indicate that in the apparatus according to the present invention the thermal equilibrium between the preheated raw meal and the combustion fumes at the outlet of the electrofilter is reached at a temperature of about 308° C. This value is comparable to that reached by the meal after 3-4 cyclone stages in a 6 stage preheater in a conventional clinker production plant. The possibility of using a suspension preheater having up to 3-4 fewer cyclone stages means a reduction in height of the support structure of the preheating apparatus of up to about 45-50 m, since the electrofilter is installed on the ground and the transportation of the dust from the electrofilter to the 3 stage cyclone preheater is carried out through a pneumatic or mechanical system (elevator).

Example 2

An apparatus according to the present invention comprising a 4 stage cyclone suspension preheater, an electrofilter and a $NO_x$ reduction system was tested.

The purified combustion fumes exiting the electrofilter were subjected to a selective catalytic reduction treatment in a suitable SCR device. The selective catalytic reduction was carried out at a temperature of about 320° C., in the presence of $NH_3$ as reducing agent (100-150 mg/Nm³, value referring to the anhydrous fumes and to 10% in volume of $O_2$). Ammonia was present in the combustion fumes, since it derives from the raw materials.

The purified combustion fumes exiting the electrofilter and fed to the SCR device had a dust (meal) concentration of about 5 g/Nm³ and a temperature of about 350° C. In the combustion fumes there was also a high concentration of $SO_2$ (100-200 mg/Nm³, value referring to the anhydrous fumes and to 10% in volume of $O_2$).

In the testing the $NO_x$ reduction efficiency, the electrical energy consumption for the cleaning with compressed air of the catalyst, the load losses caused by the clogging of the catalyst, how long the catalyst lasts and the occurrence of operating problems of the rotary kiln were evaluated.

The results obtained in the testing of the aforementioned apparatus (indicated in table 1 as "Apparatus present invention") are shown in the subsequent table 1 together with the data relative to an SCR treatment of combustion fumes from a clinker production plant of the conventional type (indicated in table 1 as "Conventional apparatus"). In the conventional apparatus the combustion fumes subjected to SCR treatment came from a 5 stage cyclone suspension preheater and they had a temperature of about 310° C. The concentration of dust in the fumes treated in the SCR system was greater than 70 g/Nm³. In the combustion fumes of the conventional apparatus there were also small concentrations of $NH_3$ and $SO_2$ deriving from the raw materials. Further $NH_3$ was then added to the treated gaseous flow to drive the SCR process in conditions as close as possible to those of the apparatus according to the present invention.

TABLE 1

| Parameter | Unit | Apparatus present invention | Conventional apparatus |
|---|---|---|---|
| Temperature | ° C. | 320 | 310 |
| $NO_x$ reduction efficiency | % | 99 | >90 |
| Cleaning system | kWh/t$_{clinker}$ | 0.2 (discontinuous) | 2 (continuous) |
| Life of the catalyst | — | >5 years | 3-5 years |
| Interruptions in operation of the rotary kiln | — | None | Frequent |
| Load losses | — | As designed | Progressively increasing due to clogging of the catalytic bed |

The results of table 1 demonstrate how the apparatus and the process object of the present invention allow the effectiveness of the SCR treatment system to also be improved with respect to an analogous treatment inserted in a conventional clinker production plant.

The results also show how the apparatus of the present invention is characterised by an excellent regularity of operation and by low energy consumption associated with the cleaning of the catalyst.

Finally, it is worth noting that a modest dust removal of the combustion fumes by means of the electrofilter (up to concentrations of the order of a gram) is sufficient to obtain a substantial increase in efficiency of the SCR device.

The invention claimed is:

1. Apparatus for the production of clinker from raw meal, comprising a rotary kiln (8);
   (a) a multistage cyclone preheater (9) connected downstream of said rotary kiln (8) in relation to the direction of flow of the fumes (11) of a combustion taking place in said kiln (8);
   (b) an electrofilter (10) connected downstream of said preheater (9) in relation to said direction of flow of the combustion fumes (11);
   (c) characterised in that it comprises a first inlet (17) for the feeding of raw meal to said combustion fumes (11), said inlet (17) being placed downstream of said preheater (9) and upstream of said electrofilter (10) in relation to said direction of flow of the combustion fumes (11), and in that it comprises a second inlet (18) for the feeding of partially preheated raw meal (14) from said electrofilter (10) to said preheater (9) said apparatus further comprising apparatus for purifying the combustion fumes cleaned of dust exiting the electrofilter from further pollutants and/or apparatus for recovering their heat wherein the apparatus for purifying the combustion fumes cleaned of dust exiting the electrofilter comprise NOx lowering means and/or a sulphur lowering device.

2. Apparatus according to claim 1 wherein the means for purifying the combustion fumes cleaned of dust exiting the electrofilter comprise NOx lowering means, preferably a selective catalytic reduction device operating with reducing additives.

3. Apparatus according to claim 1 wherein the sulphur oxide lowering device comprises a device for injecting SO2, into the combustion fumes cleaned of dust of calcium oxide- and/or calcium hydroxide-based compounds.

4. Apparatus according to claim 1 wherein the means for recovering the heat contained in the combustion fumes comprise a heat exchanger and/or a conditioning tower.

5. Apparatus according to claim 1, wherein the second inlet (18) is provided in an intermediate point between two cyclones, preferably between the first and second cyclones.

6. Apparatus according to claim 1 wherein the length of the path that connects the inlet (17) of the raw meal (22) in the combustion fumes (11) to the inlet (13) in the electrofilter (10) of the partially preheated raw meal (14) in suspension is such that the partially preheated raw meal (14) entering the preheater (9) has a temperature comprised in the 250-400° C.

7. Apparatus according to claim 1 wherein the length of the path that connects the inlet (17) of the raw meal (22) in the combustion fumes (11) to the inlet (13) in the electrofilter (10) of the partially preheated raw meal (14) in suspension is such that the partially preheated raw meal (14) entering the preheater (9) has a temperature comprised in the 270-360° C. range.

8. Apparatus according to claim 1 which includes a precalcinator.

9. Improved process for the production of clinker from raw meal in an apparatus comprising a rotary kiln (8), a multistage cyclone preheater (9) and an electrofilter (10), said process comprising the following operating steps:
   a) making the combustion fumes (11), from the rotary kiln (8), flow from bottom to top into the preheater (9);
   b) mixing the raw meal (22) with the combustion fumes (11) exiting the preheater (9), with preheating of the raw meal (14) by contact with the combustion fumes (11), and formation of a gas flow containing a partially preheated raw meal (14) in suspension;
   c) feeding the flow obtained in phase b) to the electrofilter (10) and separating the partially preheated raw meal (14) from a flow of combustion fumes cleaned of dust (15);
   d) feeding the partially preheated raw meal (14) obtained in step c) to the preheater (9) and preheating the raw meal (14) by contact in counter-flow with the combustion fumes (11) that flow from bottom to top;
   e) feeding the preheated raw meal (16) from phase d) to the rotary kiln (8) for the subsequent production of clinker and;
   submitting the combustion fumes cleaned of dust (15) exiting the electrofilter (10) to further pollutant purification treatments and/or heat recovery treatments, wherein said further pollutant purification treatments comprise a NOx lowering treatment and/or a sulphur oxide lowering treatment.

10. Process according to claim 9 wherein the partially preheated raw meal (14) which is fed to the preheater (9) in step d) has a temperature comprised in the 250-400° C. range.

11. Process according to claim 10 wherein the partially preheated raw meal (14) which is fed to the preheater (9) in step d) has a temperature comprised in the 270-360° range.

12. Process according to claim 11 wherein the NOx lowering treatment is a selective catalytic reduction process.

13. Process according to claim 9 wherein step f) comprises a sulphur dioxide lowering treatment by means of injection in the combustion fumes cleaned of dust (15) calcium oxide- and/or calcium hydroxide-based compounds.

14. A process according to claim 13 wherein step f) comprises a recovery treatment of the heat contained in the combustion fumes cleaned of dust (15) by means of at least one heat exchanger and/or one conditioning tower (21).

15. Process according to claim 9 wherein the partially preheated raw meal (14) which is fed to the preheater (9) in step d) has a temperature comprised in the 270-360° C. range.

16. Process according to claim 9 which includes a precalcinator.

* * * * *